US011074806B2

(12) United States Patent
Cho et al.

(10) Patent No.: US 11,074,806 B2
(45) Date of Patent: *Jul. 27, 2021

(54) METHOD FOR CONTROLLING VIDEO SYSTEM INCLUDING A PLURALITY OF DISPLAY APPARATUSES

(71) Applicant: Samsung Electronics Co., Ltd., Gyeonggi-do (KR)

(72) Inventors: Hyung-rae Cho, Seoul (KR); Hyun-joo Oh, Seoul (KR); Sun-ae Kim, Seoul (KR)

(73) Assignee: Samsung Electronics Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 16/399,279

(22) Filed: Apr. 30, 2019

(65) Prior Publication Data

US 2019/0259271 A1   Aug. 22, 2019

Related U.S. Application Data

(63) Continuation of application No. 14/530,252, filed on Oct. 31, 2014, now Pat. No. 10,319,217, which is a (Continued)

(30) Foreign Application Priority Data

Feb. 12, 2010   (KR) .................. 10-2010-0013592

(51) Int. Cl.
*G08C 17/02* (2006.01)
*H04N 21/41* (2011.01)
(Continued)

(52) U.S. Cl.
CPC ........ *G08C 17/02* (2013.01); *H04M 1/72415* (2021.01); *H04N 21/4122* (2013.01);
(Continued)

(58) Field of Classification Search
CPC .................................................. H04N 5/4403
See application file for complete search history.

(56) References Cited

U.S. PATENT DOCUMENTS

2001/0055951 A1   12/2001   Slotznick
2002/0193073 A1   12/2002   Fujioka
(Continued)

FOREIGN PATENT DOCUMENTS

EP   1507361   2/2005
GB   2454219   5/2009
(Continued)

OTHER PUBLICATIONS

Korean Office Action dated Nov. 18, 2015 issued in counterpart application No. 10-2010-0013592, 8 pages.

*Primary Examiner* — John W Miller
*Assistant Examiner* — Justin B Sanders
(74) *Attorney, Agent, or Firm* — The Farrell Law Firm, P.C.

(57) ABSTRACT

A method for reproducing a content in a display apparatus, a method for controlling an electronic apparatus connected to a plurality of display apparatuses, and a video system are provided. The method for reproducing a content in a display apparatus includes, based on a signal being received from a user apparatus, transmitting a response signal to the user apparatus; receiving the content and control information for reproducing the content from an external apparatus which communicates with the user apparatus; and reproducing the content based on the control information.

6 Claims, 12 Drawing Sheets

Related U.S. Application Data continuation of application No. 13/026,853, filed on Feb. 14, 2011, now Pat. No. 8,904,433.

(51) Int. Cl.
*H04N 21/422* (2011.01)
*H04N 21/436* (2011.01)
*H04N 21/442* (2011.01)
*H04N 21/485* (2011.01)
*H04M 1/72415* (2021.01)

(52) U.S. Cl.
CPC ..... *H04N 21/4126* (2013.01); *H04N 21/4222* (2013.01); *H04N 21/42204* (2013.01); *H04N 21/42222* (2013.01); *H04N 21/43615* (2013.01); *H04N 21/44222* (2013.01); *H04N 21/485* (2013.01); *G08C 2201/70* (2013.01); *G08C 2201/91* (2013.01); *G08C 2201/93* (2013.01); *H04N 21/41265* (2020.08); *H04N 21/42221* (2013.01)

(56) References Cited

U.S. PATENT DOCUMENTS

| | | |
|---|---|---|
| 2006/0194589 A1 | 8/2006 | Sankisa |
| 2007/0052534 A1* | 3/2007 | Bird ............... G01S 5/0284 340/539.13 |
| 2007/0298815 A1 | 12/2007 | Yamashita |
| 2008/0155591 A1 | 6/2008 | Mahajan |
| 2008/0207296 A1 | 8/2008 | Lutnick |
| 2008/0273079 A1 | 11/2008 | Campbell et al. |
| 2008/0318547 A1 | 12/2008 | Ballou et al. |
| 2009/0019394 A1 | 1/2009 | Sekimoto et al. |
| 2009/0049386 A1* | 2/2009 | Rekimoto ........ H04N 21/42204 715/719 |
| 2009/0132923 A1 | 5/2009 | Han |
| 2009/0164600 A1 | 6/2009 | Issa et al. |
| 2009/0270093 A1 | 10/2009 | Lee |
| 2010/0007458 A1 | 1/2010 | Cannistrato |
| 2010/0156627 A1 | 6/2010 | Kennedy |
| 2010/0188695 A1 | 7/2010 | Okigami |
| 2010/0302141 A1* | 12/2010 | Shankar ............. H04M 1/7253 345/156 |
| 2011/0012743 A1 | 1/2011 | Van Gorp |

FOREIGN PATENT DOCUMENTS

| | | |
|---|---|---|
| JP | 2005-175862 | 6/2005 |
| JP | 2006-319680 | 11/2006 |
| JP | 2007-074056 | 3/2007 |
| KR | 10-2009-0059651 | 6/2009 |
| KR | 10-2009-0075376 | 7/2009 |

* cited by examiner

METHOD FOR CONTROLLING VIDEO SYSTEM INCLUDING A PLURALITY OF DISPLAY APPARATUSES

PRIORITY

This application is a Continuation application of U.S. patent application Ser. No. 14/530,252, which was filed in the U.S. Patent and Trademark Office on Oct. 31, 2014, which was a Continuation application of U.S. patent application Ser. No. 13/026,853, which was filed in the U.S. Patent and Trademark Office on Feb. 14, 2011, and issued as U.S. Pat. No. 8,904,433 on Dec. 2, 2014, which claimed priority under 35 U.S.C. § 119(a) to Korean Patent Application No. 10-2010-0013592, which was filed in the Korean Intellectual Property Office on Feb. 12, 2010, the entire disclosures of each of which are incorporated herein by reference.

BACKGROUND OF THE INVENTION

1. Field of the Invention

The present invention relates generally to a method for controlling a video system, and more particularly, to a method for controlling a video system including a plurality of display apparatuses.

2. Description of the Related Art

Recently, with the development of mobile device technologies, mobile devices have become capable of providing various functions, including communicating with other apparatuses which allows mobile devices to be operated in association with other various apparatuses. For example, a mobile device may provide various functions as being communicably connected to a television.

In addition, a mobile device may be connected to a plurality of televisions and control the plurality of televisions. Therefore, various functions are possible using a mobile device and a television together.

However, selecting a television to be controlled from among a plurality of televisions can be a complicated process. For example, in order to select a desired television using a mobile device, a user should display a list of a plurality of televisions on a screen, check information of each television, and select a desired television, which is not a convenient way for a user to select a desired television using a mobile device. Therefore, a method for allowing the user to select a television using a mobile device conveniently is required.

SUMMARY OF THE INVENTION

The present invention has been made to address at least the above problems and/or disadvantages and to provide at least the advantages described below.

In accordance with an aspect of the present invention, a method for reproducing a content in a display apparatus is provided. The method includes, based on a signal being received from a user apparatus, transmitting a response signal to the user apparatus; receiving the content and control information for reproducing the content from an external apparatus which communicates with the user apparatus; and reproducing the content based on the control information.

In accordance with another aspect of the present invention, a method for controlling an electronic apparatus connected to a plurality of display apparatuses is provided. The method includes transmitting a content to a first display apparatus among the plurality of display apparatuses; based on information on the first display apparatus being received from a user apparatus, identifying the first display apparatus as a closest display apparatus to the user apparatus; and based on the first display apparatus being identified as the closest display apparatus, transmitting the content to a second display apparatus among the plurality of display apparatuses.

In accordance with another aspect of the present invention, a video system is provided. The video system includes a user apparatus configured to display a content; and a plurality of display apparatuses connected to an external apparatus, wherein the user apparatus is configured to identify a closest display apparatus to the user apparatus from among the plurality of display apparatuses based on an intensity of a signal received from each of the plurality of display apparatuses, and in response to identifying the closest display apparatus, transmit information on the closest display apparatus and the content being displayed in the user apparatus to the external apparatus, and wherein each of the plurality of display apparatuses is configured to, based on being identified as the closest display apparatus from among the plurality of display apparatuses, reproduce the content based on receiving the content from the external apparatus.

BRIEF DESCRIPTION OF THE DRAWINGS

The above and/or other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
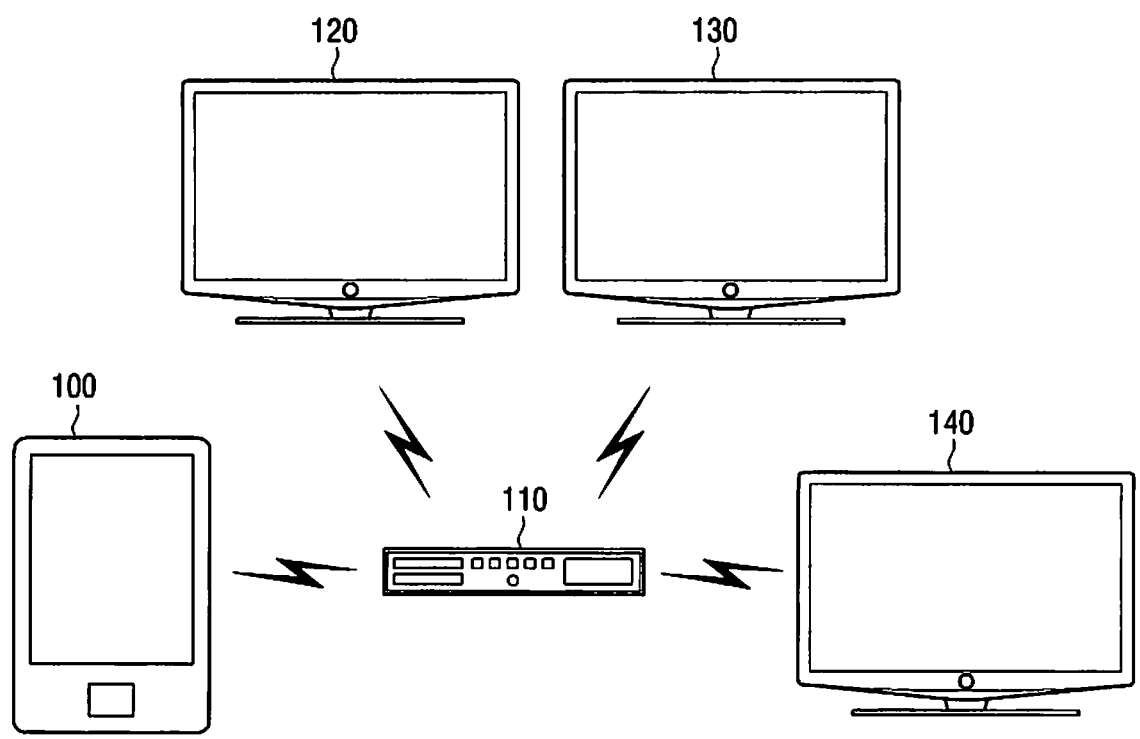
FIG. 1 is a diagram illustrating a video system according to an embodiment of the present invention.

Certain embodiments of the present invention are described in more detail below with reference to the accompanying drawings.

In the following description, similar reference numerals are used for similar elements, throughout the drawings. The matters defined in the description, such as detailed construction and elements, are provided to assist in a comprehensive understanding of the embodiments of the present invention. However, the present invention can be practiced without those specifically defined matters. Also, well-known functions or constructions are not described in detail since they would obscure the present invention with unnecessary detail.

FIG. 1 is a diagram illustrating a video system according to an embodiment of the present invention. As illustrated in FIG. 1, a video system comprises a user apparatus 100, a set-top box 110, and a plurality of televisions 120, 130, 140.

The user apparatus 100 is an apparatus that is carried and used by a user, but is not limited to a mobile device. That is, the user apparatus 100 may be any apparatus capable of controlling a video system. For example, the user apparatus 100 may be a cellular phone, a media planner, a mobile content reproducing apparatus (an MP3 player, a PMP, and so forth), a PDA, a mobile computer, and a remote controller.

The user apparatus 100 is communicably connected to the set-top box 110. In addition, the user apparatus 100 may also be communicably connected to the plurality of televisions 120, 130, 140. The user apparatus 100 may be connected to the set-top box 110 and the plurality of televisions 120, 130, 140 through a mobile communication network, a Bluetooth® connection, or a wireless LAN.

The user apparatus 100 detects the distance to each of the plurality of televisions 120, 130, 140. Specifically, if a specific input entered by a user, the user apparatus 100 detects the distance to each of the plurality of televisions 120, 130, 140. Herein, the specific input represents an input to switch functions between televisions. That is, the user apparatus 100 controls to reproduce content of the nearest television on another television.

The user apparatus 100 detects the distance to each of the plurality of televisions 120, 130, 140 using various methods. The user apparatus 100 may detect the distance using strength of an RF signal, Received Signal Strength Indication (RSSI), or Chirp Spread Spectrum (CSS). The RF signal may be various local communication signals such as WIFI (wireless LAN), Bluetooth®, and Zigbee. The distance may be detected using various methods in addition to the method of using strength of an RF signal.

The user apparatus 100 broadcasts a signal for detecting a distance to the plurality of televisions 120, 130, 140 when detecting the distance and receives a signal from the plurality of televisions 120, 130, 140 in response to the distance detection signal. The response signal includes distance information and apparatus information regarding each television. Specifically, information regarding a television is included in a header of the response signal packet. Accordingly, the user apparatus 100 may recognize a location of each television.

The user apparatus 100 selects a television which is located in the nearest position (hereinafter, the nearest television) using detected distance information.

The user apparatus 100 selects a television to be switched from among the plurality of televisions 120, 130, 140. Herein, the television to be switched represents a television of which content being reproduced is switched to content of the nearest television.

The user apparatus 100 may set a list of candidates for a television to be switched in various ways. For example, the user apparatus 100 may select a television to be switched from a pre-registered television list. Alternatively, the user apparatus 100 may select a television to be switched from among televisions which transmit a response signal to a distance measurement signal.

The user apparatus may select a television to be switched automatically. The user apparatus 100 requests the set-top box 110 to send reference information regarding the nearest television. In response, the user apparatus 100 receives the reference information regarding the nearest television from the set-top box 110. The user apparatus 100 selects a television to be switched from among the plurality of televisions 120, 130, 140 based on the reference information. Specifically, a user is registered in each of the plurality of televisions 120, 130, 140. Accordingly, the user apparatus 100 compares reference information with user information, selects a suitable user from among users of the plurality of televisions 120, 130, 140, and selects a television of the selected user as a television to be switched.

Herein, the reference information represents information based on which the nearest television is selected automatically. The reference information includes information regarding content being reproduced in the nearest television or history information regarding the nearest television.

The information regarding content being reproduced in the nearest television represents information based on which a suitable user is selected. Specifically, the information regarding content being reproduced in the nearest television includes information regarding an age of the viewers and genre of the content (such as, sport, drama, cartoons, education, and so forth).

For example, suppose that the age of a user registered in a first TV 120 is 7, the age of a user registered in a second TV 130 is 20, and the age of a user registered in a third TV 140 is 50. According to reference information, if the age of viewers of content being reproduced in the nearest television is 7 and the genre of the content is cartoons, the user apparatus 100 selects the first TV 120 as a television to be switched based on the reference information.

The history information regarding the nearest television is information based on which a user who uses the nearest television for the last time is determined using usage history of users of the nearest television. Specifically, the history information includes details of connected user IDs, details of connections to a user apparatus, details of commands input to a user apparatus, a list of preferred content for each user, details of reserved programs, and details of recording commands.

Suppose that a user registered in the first TV 120 is user A, a user registered in the second TV 130 is user B, and a user registered in the third TV 140 is user C. If it is recorded in the details of connected IDs that user B is the last person connected to the nearest television, the user apparatus 100 selects the second TV 130 as a television to be switched since the last user of the nearest television is highly likely to be a person who is watching content being currently reproduced. Therefore, the user apparatus 100 determines the latest user of the nearest television using history information and selects a television in which the user is registered as a television to be switched.

As such, the user apparatus 100 selects a television to be switched using reference information.

The user apparatus 100 may select a television to be switched manually. The user apparatus 100 selects a television to be switched from among the plurality of televisions 120, 130, 140 according to a user selection. That is, if one television is selected from among the plurality of televisions 120, 130, 140 according to a user input, the user apparatus 100 selects the television selected by the user as a television to be switched.

Subsequently, the user apparatus 100 transmits a switch command, information regarding the nearest television, and information regarding a television to be switched to the set-top box 110. Herein, the information regarding the nearest television and the information regarding a television to be switched represent information to define the nearest television and a television to be switched and may include apparatus information, apparatus ID, and a serial number.

Accordingly, the set-top box 110 may recognize which television is the nearest television and which television is a television to be switched from among the plurality of televisions 120, 130, 140 using the information regarding the nearest television and the information regarding a television to be switched.

The switch command represents a command to switch content being reproduced in a television to be switched with content being reproduced in the nearest television. Accordingly, if the switch command is received, the set-top box 110 performs the switching operation.

The set-top box 110 transmits content to the plurality of televisions 120, 130, 140. Specifically, the set-top box 120 controls content input to the plurality of televisions 120, 130, 140.

Specifically, the set-top box 110 controls a television to be switched so that content being reproduced in the nearest television is reproduced in the television to be switched using information regarding the nearest television and information regarding the television to be switched.

To do so, the set-top box 110 identifies the nearest television and a television to be switched from among the plurality of televisions 120, 130, 140 using information regarding the nearest television and information regarding the television to be switched. Subsequently, the set-top box 110 transmits content being reproduced in the nearest television to the television to be switched.

The set-top box 110 identifies a channel currently being selected in the nearest television using information regarding the nearest television and information regarding the television to be switched. The information regarding the nearest television includes channel information. The set-top box 110 switches a broadcast channel of the television to be switched with a broadcast channel of the nearest television.

As such, the set-top box 110 controls to reproduce content being reproduced in the nearest television in a television to be switched.

The plurality of televisions 120, 130, and 140 are controlled by the set-top box 110 and display content provided by the set-top box 110 respectively. In FIG. 1, the plurality of televisions 120, 130, 140 include the first TV 120, the second TV 130, and the third TV 140, but more televisions may be included in the plurality of televisions 120, 130, and 140. In addition, the plurality of televisions include the user apparatus 100, the nearest television, and a television of which content is to be switched.

As described above, a video providing system is controlled by the user apparatus 100. Specifically, content of the nearest television is reproduced in a television to be switched and thus, a user may reproduce content being reproduced in the nearest television in another television and watch another content using the nearest television.

Figure 2A:
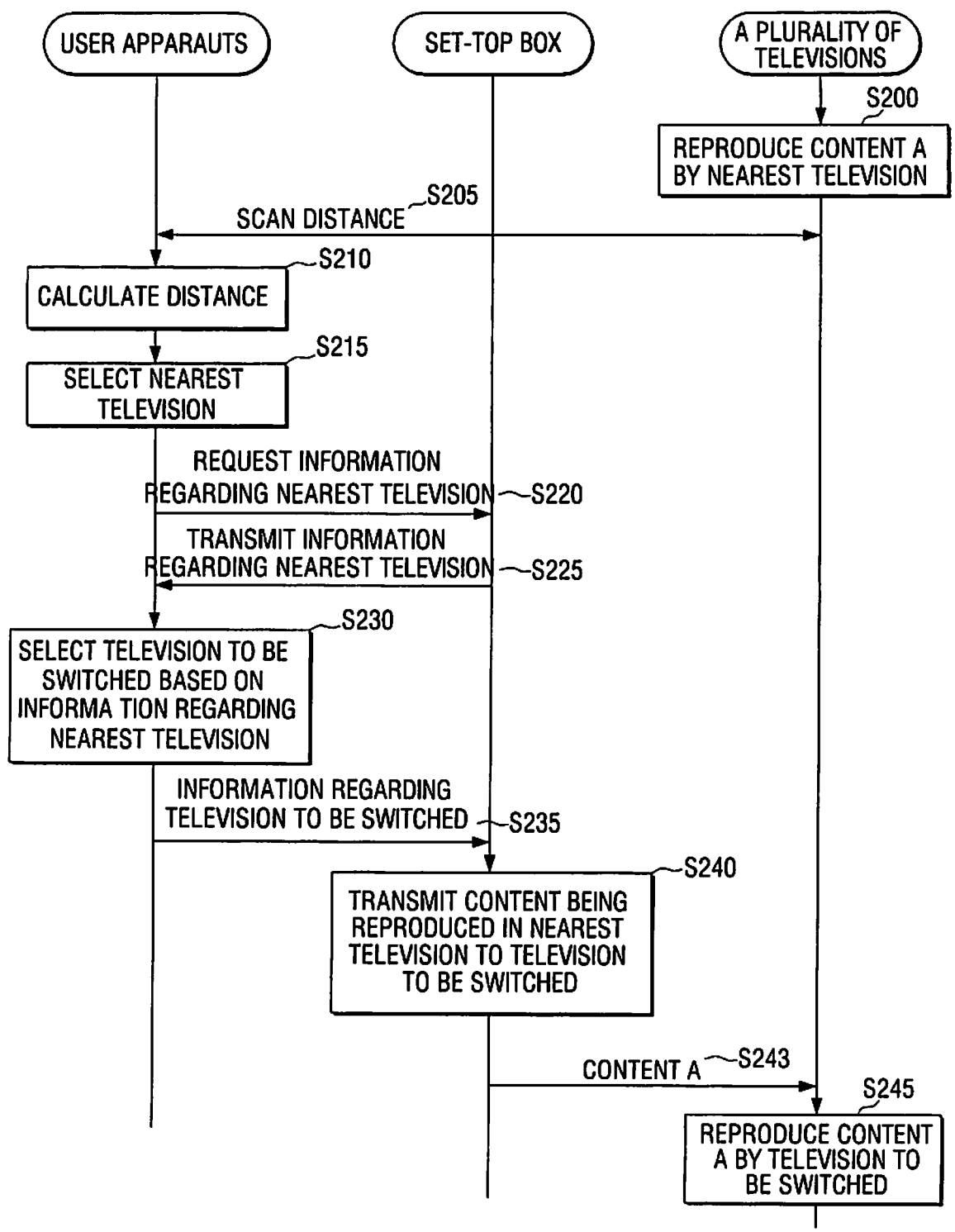
FIG. 2A is a flowchart illustrating a method for controlling a video system where a television to be switched is automatically selected according to an embodiment of the present invention.

Hereinafter, a method for controlling a video system will be explained with reference to FIGS. 2A and 2B. FIG. 2A is a flowchart to explain a method for controlling a video system where a television to be switched is automatically selected according to an embodiment of the present invention.

As illustrated in FIG. 2A, the nearest television which is located in the nearest position from among a plurality of televisions is reproducing content A in Step S200. Herein, although a distance to each of the plurality of televisions is not measured yet, it should be noted that a television to be selected as the nearest television from among the plurality of televisions is currently reproducing content A in Step S200.

Subsequently, the user apparatus 100 scans the distance to each of the plurality of televisions in Step S205. The user apparatus 100 calculates the distance to each of the plurality of televisions using the scanning information in Step S210 and selects the nearest television which is located in the nearest position using the calculated distance information in Step S215.

The user apparatus 100 requests the set-top box 110 to send reference information regarding the selected nearest television in Step S220. Accordingly, the set-top box 110 transmits the reference information regarding the nearest television to the user apparatus 100 in Step S225.

The user apparatus 100 selects a television to be switched based on the received information regarding the nearest television in Step S230. Specifically, a user is registered in each of the plurality of televisions 120, 130, 140. Accordingly, the user apparatus 100 compares reference information with user information, selects a suitable user from among users of the plurality of televisions 120, 130, 140, and selects a television of the selected user as a television to be switched. Herein, the reference information represents information based on which the nearest television is selected automatically. The reference information includes information regarding content being reproduced in the nearest television or history information regarding the nearest television. The process of selecting a television to be switched by the user apparatus 100 and the reference information have been provided in detail with reference to FIG. 1.

Subsequently, the user apparatus 100 transmits information regarding the nearest television and information regarding a television to be switched in Step S235. Herein, the information regarding the nearest television and the information regarding a television to be switched represent information to define the nearest television and a television to be switched and may include apparatus information, apparatus ID, and a serial number. Accordingly, the set-top box 110 may recognize which television is the nearest television and which television is a television to be switched from among the plurality of televisions 120, 130, 140 using the information regarding the nearest television and the information regarding a television to be switched.

The set-top box 110 controls a television to be switched so that content being reproduced in the nearest television is reproduced in the television to be switched using information regarding the nearest television and information regarding the television to be switched. To do so, the set-top box 110 identifies the nearest television and a television to be switched from among the plurality of televisions 120, 130, 140 using information regarding the nearest television and information regarding the television to be switched. The set-top box 110 transmits content being reproduced in the nearest television to the television to be switched in Step S240.

Subsequently, the set-top box 110 transmits content A being reproduced in the nearest television to the television to be switched in Step S243, and the television to be switched reproduces content A in Step S245.

Alternatively, the set-top box 110 may allow the television to be switched to reproduce content of the nearest television by switching a broadcast channel of the television to be switched with a broadcast channel of the nearest television. Specifically, the set-top box 110 identifies a channel currently being selected in the nearest television using information regarding the nearest television and information regarding the television to be switched. The information regarding the nearest television includes channel information. Subsequently, the set-top box 110 switches a broadcast channel of the television to be switched with a broadcast channel of the nearest television.

As described above, the user apparatus 100 selects a television to be switched automatically using reference information without a user input, and the television to be switched reproduces content of the nearest television under the control of the user apparatus 100. Accordingly, a user may reproduce content being reproduced in the nearest television in another television and watch another content using the nearest television.

Figure 2B:
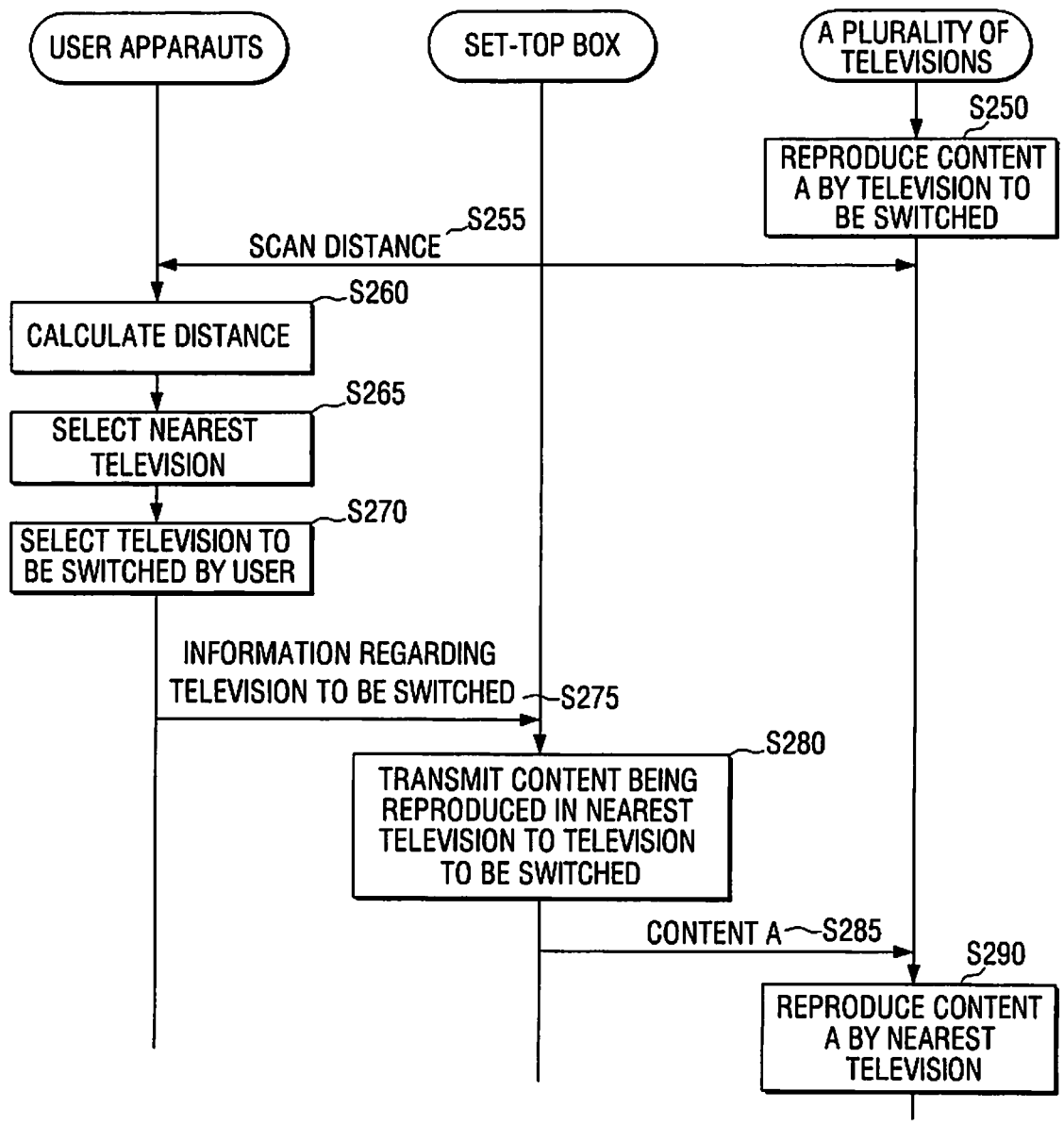
FIG. 2B is a flowchart illustrating a method for controlling a video system where a television to be switched is manually selected according to an embodiment of the present invention.

FIG. 2B is a flowchart to explain a method for controlling a video system where a television to be switched is manually selected according to an embodiment of the present invention.

As illustrated in FIG. 2A, the nearest television which is located in the nearest position from among a plurality of televisions is reproducing content A. Herein, although a distance to each of the plurality of televisions is not measured yet, it should be noted that a television to be selected as the nearest television from among the plurality of televisions is currently reproducing content A in Step S250.

Subsequently, the user apparatus 100 scans the distance to each of the plurality of televisions in Step S255. The user apparatus 100 calculates the distance to each of the plurality of televisions using the scanning information in Step S260 and selects the nearest television which is located in the nearest position using the calculated distance information in Step S265.

The user apparatus selects a television to be switched based on a user selection in Step S270. Specifically, the user apparatus 100 displays a list of the plurality of televisions 120, 130, 140 on the screen and selects a television selected by the user from the list as a television to be switched.

Subsequently, the user apparatus 100 transmits information regarding the nearest television and information regarding a television to be switched in Step S275. Herein, the information regarding the nearest television and the information regarding a television to be switched represent information to define the nearest television and a television to be switched and may include apparatus information, apparatus ID, and a serial number. Accordingly, the set-top box 110 may recognize which television is the nearest television and which television is a television to be switched from among the plurality of televisions 120, 130, 140 using the information regarding the nearest television and the information regarding a television to be switched.

The set-top box 110 controls a television to be switched so that content being reproduced in the nearest television is reproduced in the television to be switched using information regarding the nearest television and information regarding the television to be switched. To do so, the set-top box 110 identifies the nearest television and a television to be switched from among the plurality of televisions 120, 130, 140 using information regarding the nearest television and information regarding the television to be switched. The set-top box 110 transmits content being reproduced in the nearest television to the television to be switched in Step S280.

Subsequently, the set-top box 110 transmits content A being reproduced in the nearest television to the television to be switched in Step S285, and the television to be switched reproduces content A in Step S290.

Alternatively, the set-top box 110 may allow the television to be switched to reproduce content of the nearest television by switching a broadcast channel of the television to be switched with a broadcast channel of the nearest television. Specifically, the set-top box 110 identifies a channel currently being selected in the nearest television using information regarding the nearest television and information regarding the television to be switched. The information regarding the nearest television includes channel information. Subsequently, the set-top box 110 switches a broadcast channel of the television to be switched with a broadcast channel of the nearest television.

As described above, the user apparatus 100 selects a television to be switched manually according to a user selection. The television to be switched reproduces content of the nearest television under the control of the user apparatus 100. Accordingly, a user may reproduce content being reproduced in the nearest television in another television and watch another content using the nearest television.

Hereinafter, a process of controlling a video system using the user apparatus 100 will be explained in detail with reference to FIGS. 3A to 3I. FIGS. 3A to 3I are diagrams illustrating a process of controlling a video system using the user apparatus 100 according to an embodiment of the present invention.

Figure 3A:
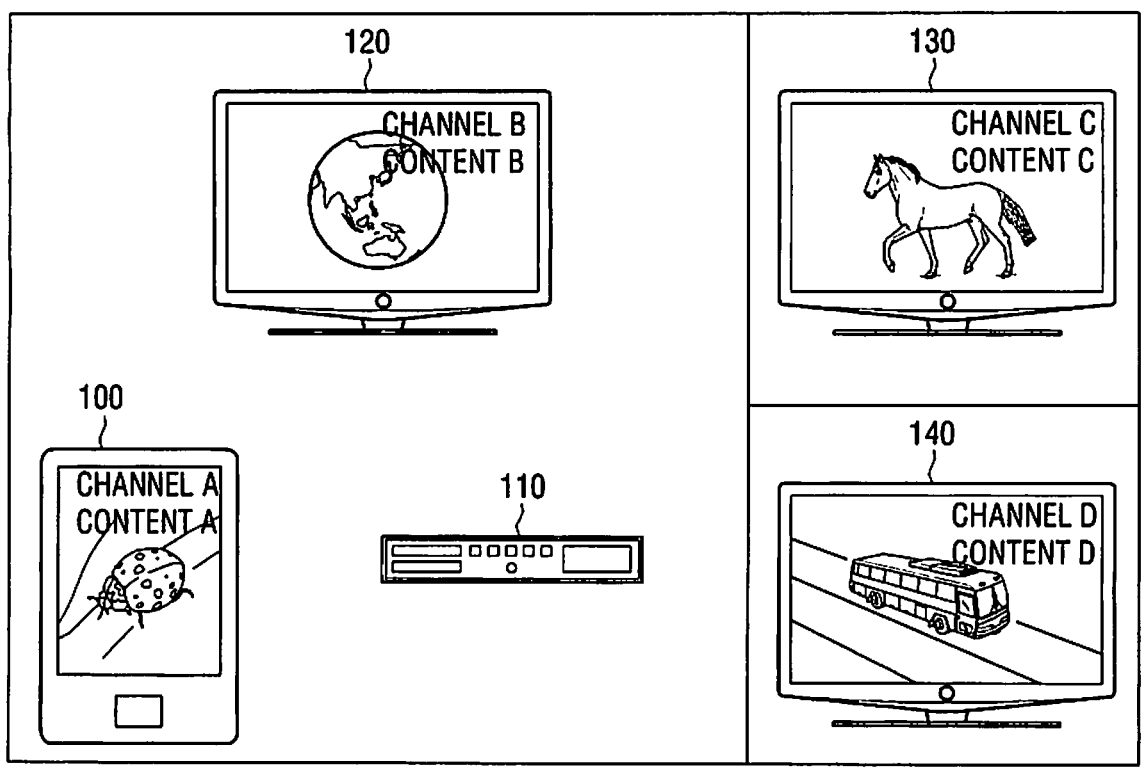
FIGS. 3A to 3I are diagrams illustrating a process of controlling a video system using a user apparatus 100 according to an embodiment of the present invention.

FIG. 3A is a diagram illustrating a video system including three televisions 120, 130, 140 and the set-top box 110 and the user apparatus 100 for controlling thereof. As illustrated in FIG. 3A, the user apparatus 100 is reproducing content A of channel A. In addition, it can be seen that the first TV 120 is reproducing content B of channel B, the second TV 130 is reproducing content C of channel C, and the third TV 140 is reproducing content D of channel D.

Figure 3B:
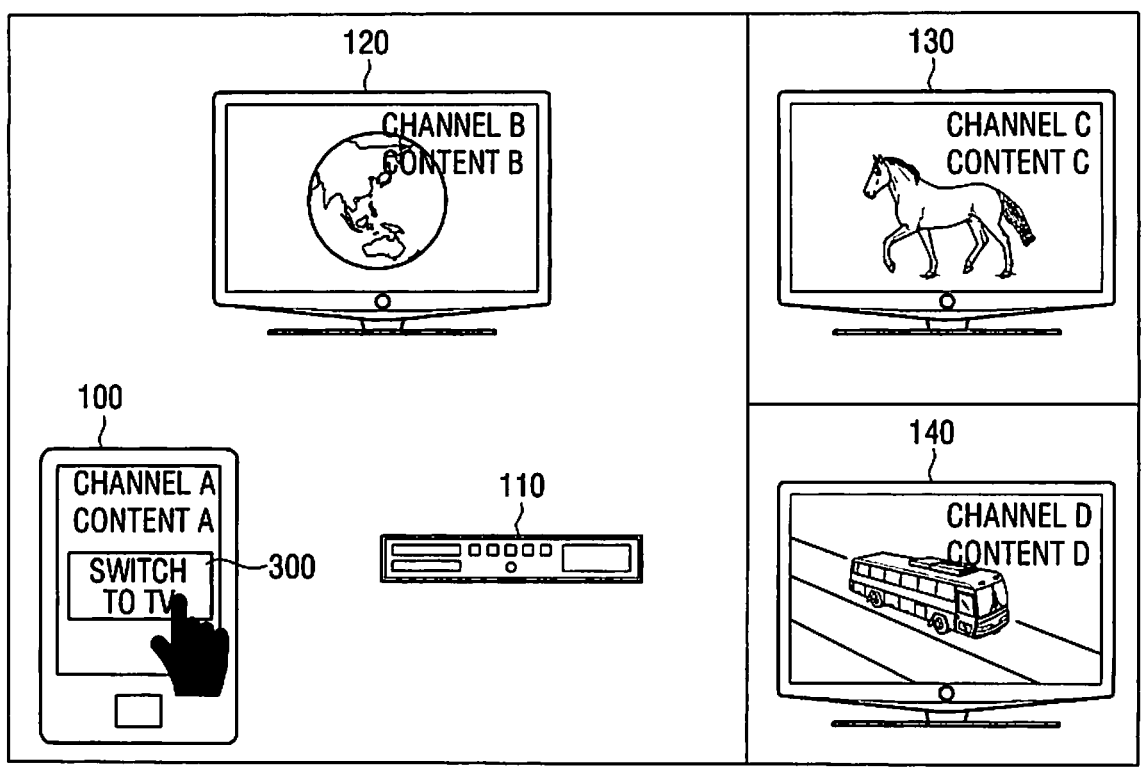

As illustrated in FIG. 3B, the user apparatus 100 may display a switch-to-TV function button 300 on the screen. Herein, the switch-to-TV function button 300 represents a button to receive a command to perform a function of reproducing a channel or content being reproduced in the user apparatus 100 in the nearest television.

Figure 3C:
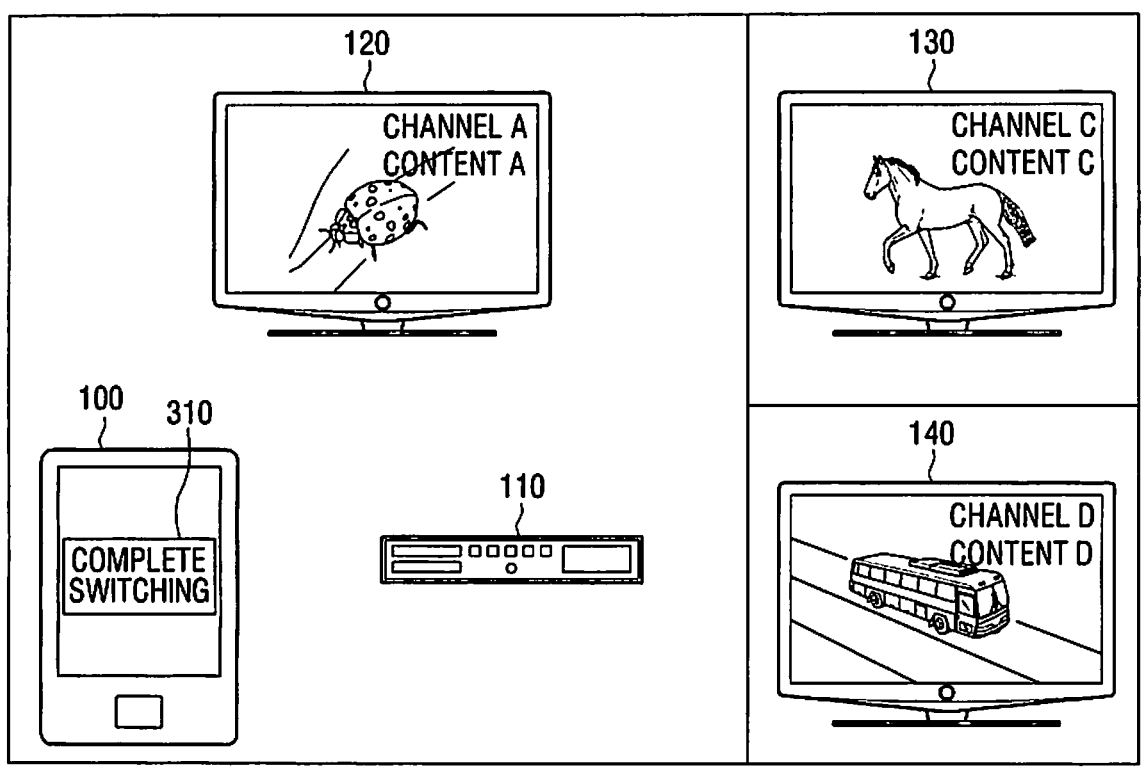

Accordingly, as illustrated in FIG. 3B, if the switch-to-TV function button 300 is selected, channel A or content A which is a channel or content being reproduced in the user apparatus 100 is reproduced in the first TV 120 as illustrated in FIG. 3C. That is, in FIG. 3C, a television nearest to the user apparatus 100 is the first TV 120, and a channel of the first TV 120 is changed from channel B to channel A by the user apparatus 100. Subsequently, a switch completion message 310 is displayed on the screen of the user apparatus 100.

As such, the user apparatus may control to reproduce a channel and content being reproduced in the user apparatus 100 in the nearest television. Accordingly, a user may watch content outside the home using the user apparatus and continue to watch the same content inside the home using the switch function.

Figure 3D:
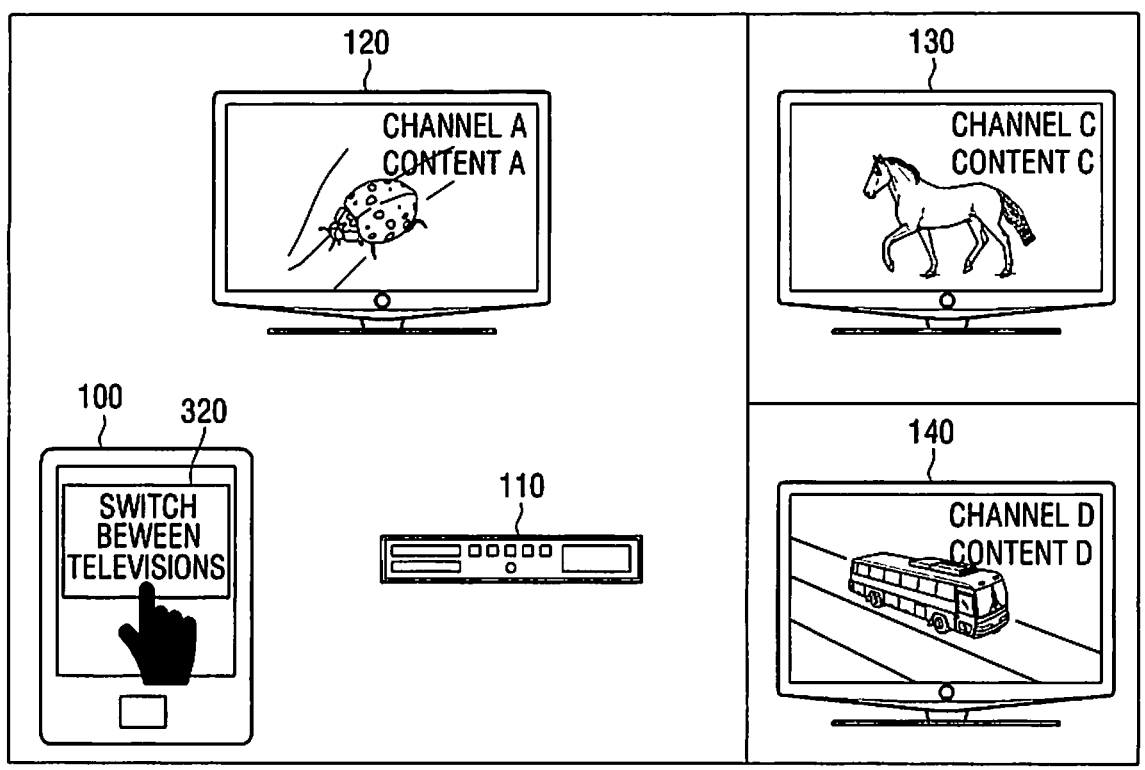

As illustrated in FIG. 3D, a user apparatus displays a switch-between-TV function button 320 on the screen. Herein, the switch-between-TV function 320 represents a button to receive a command to perform a function of controlling the user apparatus 100 so that content of the nearest television is reproduced in another television.

Figure 3E:
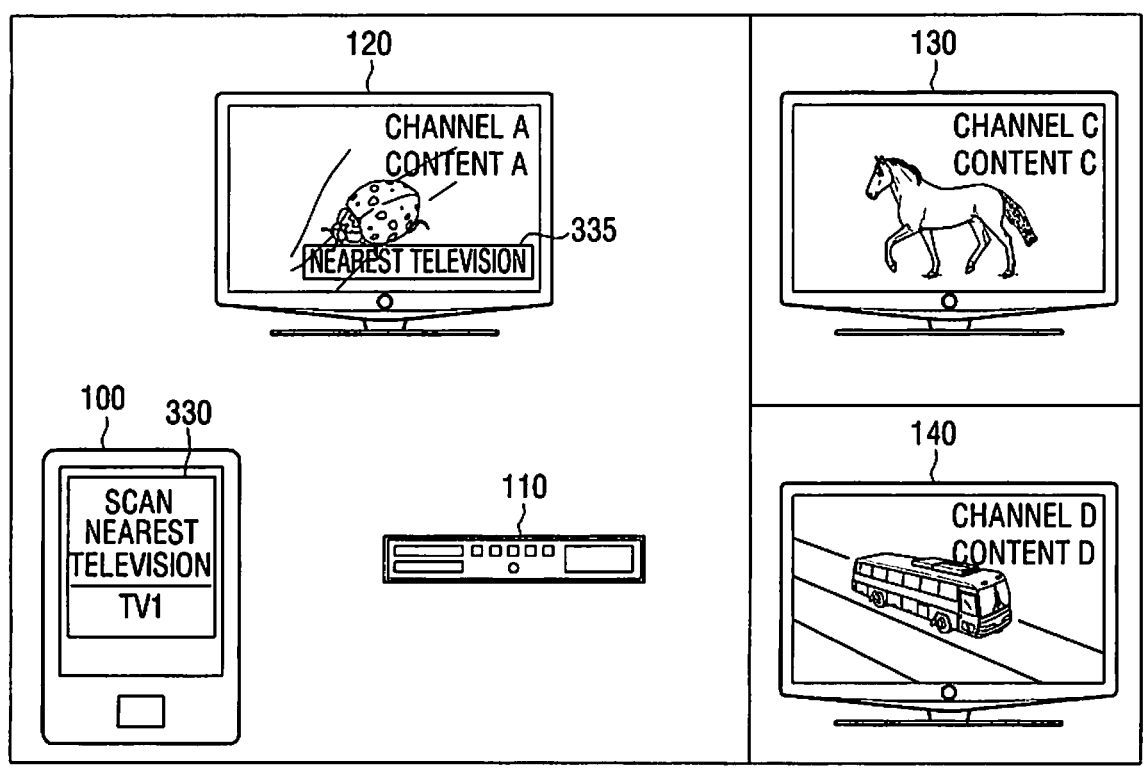

Accordingly, as illustrated in FIG. 3D, if the switch-between-TV function button 320 is selected, the user apparatus 100 scans the nearest television as illustrated in FIG. 3E. Referring to a scanning window for the nearest television 330 in FIG. 3E, it can be seen that the first TV 120 (that is, TV 1) is selected as the nearest television.

A nearest television icon 335 indicating that the nearest television is selected is displayed on the screen of the first TV 120. Accordingly, a user may easily identify which television is the nearest television.

Figure 3F:
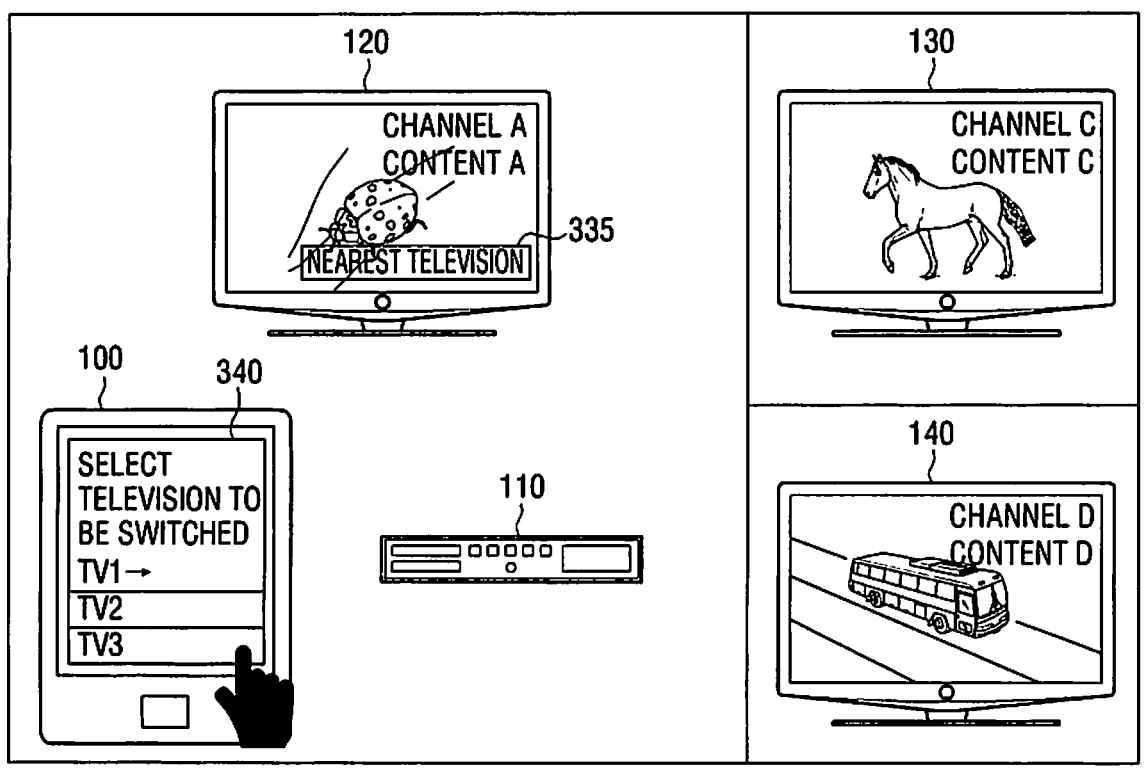

Subsequently, as illustrated in FIG. 3F, the user apparatus 100 displays a window for selecting a television to be switched 340 on the screen. A user may select a desired television as a television to be switched using the window for selecting a television to be switched 340.

However, the process of FIG. 3F is not performed if the user apparatus 100 is set to select a television to be switched automatically.

Figure 3G:
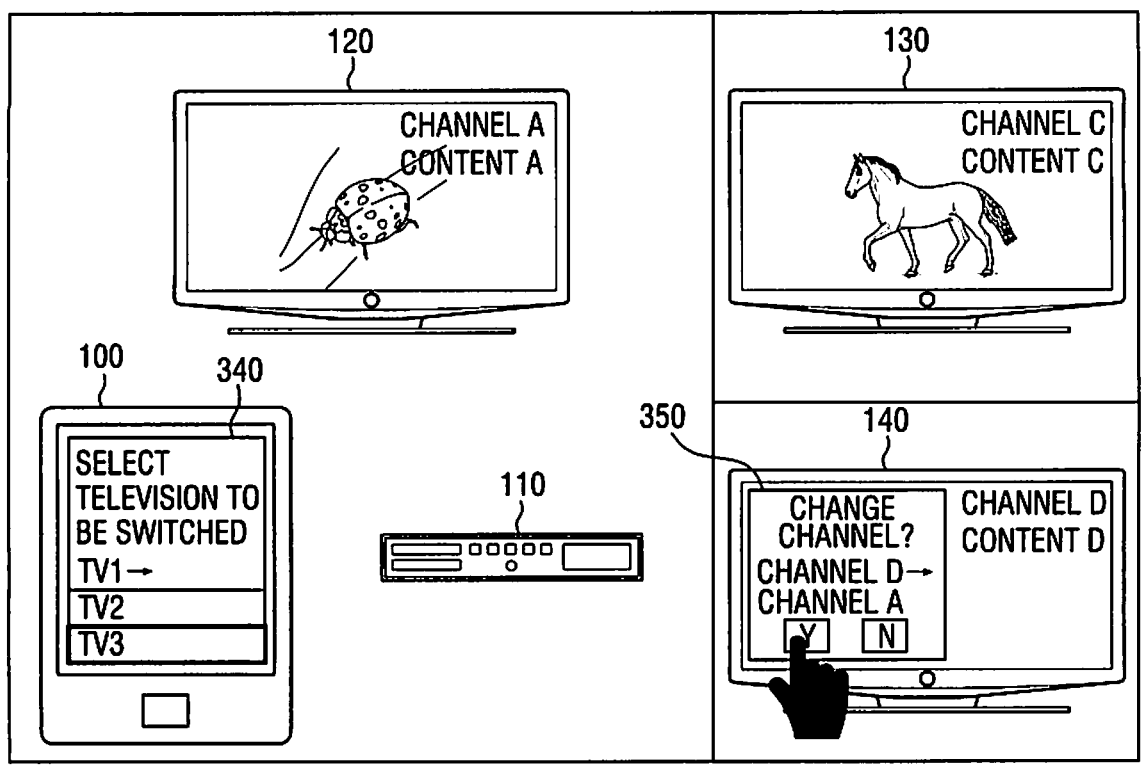

As illustrated in FIG. 3F, if the third TV 140 (that is, TV 3) is selected as a television to be switched by a user, a channel switch confirming message 350 is displayed on the screen of the third TV 140 as illustrated in FIG. 3G.

Figure 3H:
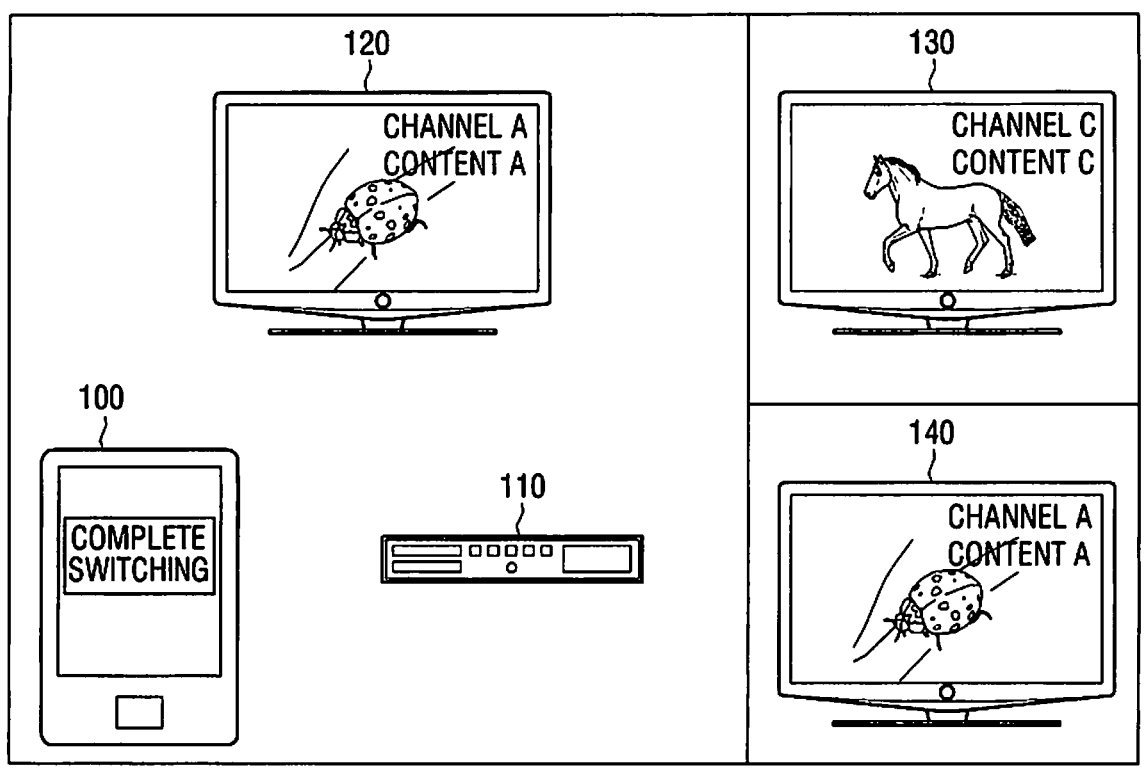

If 'Yes' is selected in the channel switch confirming message 350, a channel of the third TV 140 is switched with a channel A which is being reproduced in the first TV 120 which is the nearest television, as illustrated in FIG. 3H.

Figure 3I:
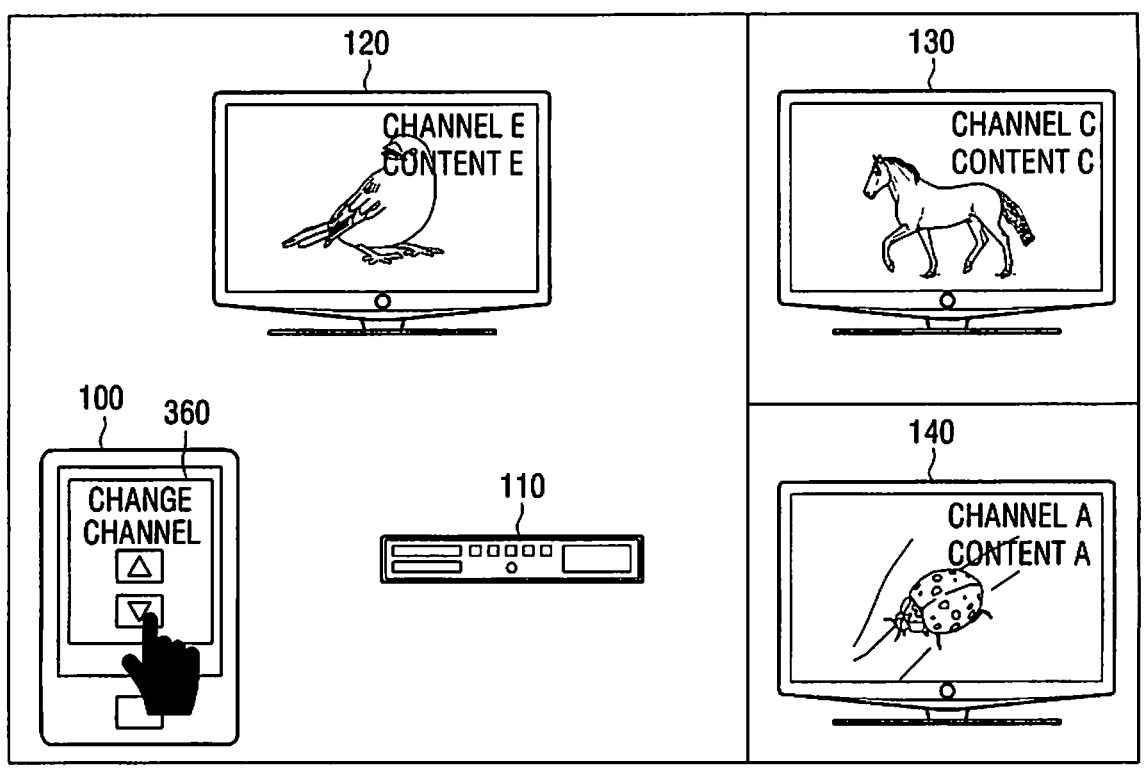

Subsequently, as illustrated in FIG. 3I, if a channel switch command is input through a channel switch window 360, a channel of the first TV 120 which is the nearest television is changed. It can be seen that a channel of the first TV 120 is changed to channel E and content is also changed to content E in FIG. 3I.

Through the above process, a television to be switched reproduces content of the nearest television. Accordingly, a user may reproduce content being reproduced in the nearest television in another television and watch other content using the nearest television.

In the embodiment of the present invention, a video system is a set-top box and a plurality of televisions, but the video system may include various video apparatuses. For example, the video system may include a Blu-ray player, a DVD player, a monitor, and a home theater.

In the embodiment of the present invention, a display apparatus is a television, but this is only an example. The display apparatus may be not only a television but also a monitor, a PMP, a mobile display.

In the embodiment of the present invention, a video system consists of a set-top box and a plurality of televisions, but this is only an example. The video system may consist of only a plurality of televisions. Specifically, in the embodiment of the present invention, a plurality of televisions may be directly controlled by a user apparatus without a set-top box.

Although several embodiments of the present invention have been shown and described, it would be appreciated by those skilled in the art that changes may be made in these embodiments without departing from the principles and spirit of the invention, the scope of which is defined in the appended claims.

What is claimed is:

1. A method for reproducing a content in a display apparatus, the method comprising:
    based on a signal being received at the display apparatus from a user apparatus which reproduces the content, transmitting a response signal from the display apparatus to the user apparatus;
    based on the display apparatus among a plurality of display apparatuses being determined as an apparatus to reproduce the content, receiving, at the display apparatus, from an external apparatus which communicates with the user apparatus, the content, which is reproduced on the user apparatus, and control information, which is for reproducing the content; and
    reproducing, at the display apparatus, the content based on the control information,
    wherein the display apparatus is closest to the user apparatus among the plurality of display apparatuses.

2. The method of claim 1,
    wherein the display apparatus is a display apparatus which is identified as a closest display apparatus to the user apparatus based on an intensity of the response signal.

3. The method of claim 1,
    wherein the control information regarding the content comprises information on a broadcast channel of the user apparatus, and
    wherein the reproducing the content comprises changing a broadcast channel of the display apparatus to the broadcast channel of the user apparatus.

4. A method for controlling an electronic apparatus connected to a plurality of display apparatuses, the method comprising:
    transmitting a content to a first display apparatus among the plurality of display apparatuses;
    based on information on the first display apparatus being received from a user apparatus, identifying the first display apparatus as a closest display apparatus to the user apparatus; and
    based on the first display apparatus being identified as the closest display apparatus, transmitting the content to a second display apparatus among the plurality of display apparatuses.

5. The method of claim 4, further comprising:
    receiving, from the user apparatus, a content reproduced on the user apparatus; and
    transmitting the received content to the first display apparatus.

6. A video system, comprising:
    a user apparatus configured to display a content; and
    a plurality of display apparatuses connected to an external apparatus, wherein the user apparatus is configured to identify a closest display apparatus to the user apparatus from among the plurality of display apparatuses based on an intensity of a signal received from each of the plurality of display apparatuses, and in response to identifying the closest display apparatus, transmit information on the closest display apparatus and the content being displayed in the user apparatus to the external apparatus, and
    wherein each of the plurality of display apparatuses is configured to, based on being identified as the closest display apparatus from among the plurality of display apparatuses, reproduce the content based on receiving the content from the external apparatus.

* * * * *